Patented Sept. 25, 1934

1,974,689

UNITED STATES PATENT OFFICE 1,974,689

AGENTS FOR KILLING INSECTS

Kaspar Pfaff and Michael Erlenbach, Frankfort-on-the-Main, Germany, assignors to Winthrop Chemical Company, Inc., New York, N. Y., a corporation of New York No Drawing. Application September 18, 1931, Serial No. 563,676. In Germany September 27, 1930

9 Claims. (Cl. 167—30)

The present invention relates to agents for killing insects.

We have found that compounds of the aromatic series which contain at the same time esterified carboxyl groups and an esterified or etherified OH-group, having the following general formula

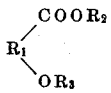

wherein $R_1$ stands for a benzene or naphthalene nucleus which may contain one or more alkyl, O-alkyl or halogen groups, $R_2$ stands for an alkyl, aryl or aralkyl group and $R_3$ stands for alkyl, aryl

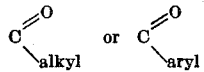

are especially suitable for killing or eliminating insects. These compounds are particularly suitable for killing or eliminating flies, since they have a particularly high action when sprayed. By spraying, for instance 1 cc. of a solution of 15 parts of 2-chloro-4-methoxy-1-benzoic acid methylester in 85 parts of petroleum distillate for each cubic meter of the room space, 97 per cent. of the flies present are killed already within the first 5 minutes. This effect could hitherto only be attained with the pyrethrum preparations; but in comparison therewith the new agent has the essential advantage that it completely kills the flies and does not merely torpify them, as is the case with pyrethrum preparations.

The aforesaid compounds may be applied by spraying their solutions in high boiling organic solvents, for instance, petroleum distillates, lignite tar-oil, which may also be hydrogenated. There are preferably used for this purpose the fractions of these solvents, boiling between 200° C. and 260° C. The aforesaid compounds may also be utilized in the form of their aqueous emulsions. They may also be used together with synthetic or natural substances having the action of an insecticide. There may be added substances which improve the capacity of the mixture for remaining in suspension in the atmosphere when sprayed, for instance, paraffin oil. The said compounds may also be combined with substances which have a good dispersing and emulsifying power and, if required, have the properties of a wetting agent. Such substances are sulfonic acids of the aromatic series, such as sulfonated benzenes or naphthalenes; furthermore sulfonated substances of the aliphatic series, such as castor oil sulfuric acid ester or also bodies in which a sulfo-group is bound to a carbon atom, particularly those having the character of an ester, ether or acid amide, such as, for instance, the oleic acid ester of sodium hydroxyethanesulfonate; furthermore, sulfonated resins, pitches, for instance sulfite pitch.

The following are cited as examples of the compounds used in accordance with the invention:

1. 2-methoxy-1-benzoic acid phenyl ester.
2. 2-phenoxy-1-benzoic acid butyl ester.
3. 2-acetyloxy-1-benzoic acid propyl ester.
4. 2-methoxy-5-chlorobenzoic acid amyl ester.
5. 2-chloro-4-methoxy-1-benzoic acid propyl ester.
6. Benzoate of para-hydroxybenzoic acid ethyl ester.
7. Ethoxy-cresotinic acid amyl ester.
8. 3.5-dimethoxy-4-ethoxybenzoic acid amyl ester.
9. 2-methoxy-1-naphthoic acid amyl ester.
10. 2-isoamyl-hydroxy-1-naphthoic acid butyl ester.
11. 3.5-dimethoxybenzoic acid benzyl ester.
12. 2 - hydroxy - 1 - phenylaminopropan-2-sulfonic acid with oleic acid chloride.

The manufacture of some preparations which have proved to be very suitable is described in the following examples in illustration of the invention.

1. 10 parts of 2-phenoxy-1-benzoic acid methyl ester are emulsified with 15 parts of soft soap and 1 part of oleic acid ester of sodium hydroxyethane-sulfonate and the whole is made up with water to 100 parts. In a concentration of 1 per cent. the mixture is especially suitable for combating plant lice (aphis), apple-flea-lice (psyla mali) and other insects.

2. 5 parts of 5-chloro-2-methoxy-1-benzoic acid amyl ester and 5 parts of 2-methoxy-1-benzoic acid phenyl ester are dissolved in 80 parts of light oil boiling at 190° C–280° C. and 2 parts of isobornyl acetate are added for improving the odour. By using 1 cc. of the said preparation for each cubic meter of room, flies, Culicidæ and moths are killed in a short time.

3. 10 parts of dimethoxybenzoic acid amyl ester and 0.5 part of pyrethrum extract are dissolved in 20 parts of light oil. For improving the capacity for remaining in suspension in the atmosphere when sprayed, 5 parts of parffin oil are added. 2 parts of the oleic acid ester of sodium hydroxy-ethane-sulfonate are dissolved in the preparation and the whole is made up with water to 100 parts. The preparation so obtained is useful for killing flies and similar insects in stables, cellars and the like.

We claim:

1. Agents for killing insects comprising a compound of the following general formula

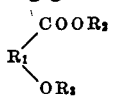

wherein $R_1$ stands for a benzene or naphthalene nucleus which may contain one or more alkyl, O-alkyl or halogen groups, $R_2$ stands for alkyl, aryl or aralkyl and $R_3$ stands for alkyl, aryl,

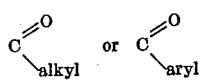

and a high boiling organic solvent.

2. Agents for killing insects comprising a compound of the following general formula

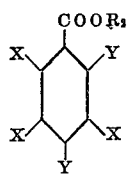

wherein $R_2$ stands for alkyl, aryl or aralkyl one Y stands for O-alkyl, O-aryl,

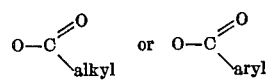

the other Y stands for hydrogen or O-alkyl, O-aryl,

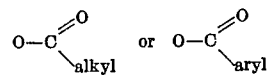

and X stands for hydrogen or halogen, alkyl, or O-alkyl, and a high boiling organic solvent.

3. Agents for killing insects comprising a compound of the following general formula

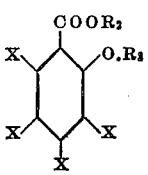

wherein $R_2$ stands for alkyl, aryl or aralkyl, $R_3$ stands for alkyl, aryl,

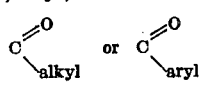

and X stands for hydrogen, halogen, alkyl or O-alkyl, and a high boiling organic solvent.

4. Agents for killing insects comprising a compound of the following general formula

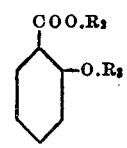

wherein $R_2$ stands for alkyl, aryl or aralkyl and $R_3$ stands for alkyl, aryl,

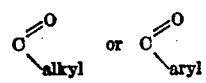

and a high boiling organic solvent.

5. Agents for killing insects comprising a compound of the following general formula

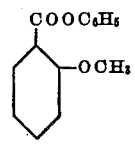

and a high boiling organic solvent.

6. Agents for killing insects comprising a compound of the following general formula

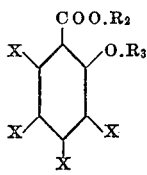

wherein $R_2$ stands for alkyl, aryl or aralkyl and $R_3$ stands for alkyl, aryl,

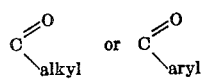

and X stands for hydrogen, halogen, alkyl or O-alkyl, and a petroleum distillate boiling between 200° C. and 260° C.

7. Agents for killing insects comprising a compound of the following general formula

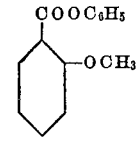

and a petroleum distillate boiling between 200° C. and 260° C.

8. Agents for killing insects comprising a compound of the following general formula

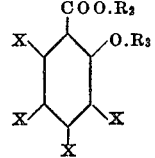

wherein $R_2$ stands for alkyl, aryl or aralkyl and $R_3$ stands for alkyl, aryl,

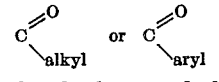

and X stands for hydrogen, halogen, alkyl or O-alkyl, and a petroleum distillate boiling between 200° C. and 260° C. and a wetting agent.

9. Agents for killing insects comprising a compound of the following general formula

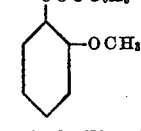

a petroleum distillate boiling between 200° C. and 260° C., and the oleic acid ester of sodium hydroxy-ethane-sulfonate.

KASPAR PFAFF.
MICHAEL ERLENBACH.